United States Patent
Gonnissen et al.

(10) Patent No.: US 6,875,943 B2
(45) Date of Patent: Apr. 5, 2005

(54) ELECTRIC DISCHARGE MACHINING WIRE

(75) Inventors: Danny Gonnissen, Roeselare (BE); Wim Van Vooren, Waregem (BE)

(73) Assignee: N.V. Bekaert S.A., Zwevegem (BE)

( * ) Notice: Subject to any disclaimer, the term of this patent is extended or adjusted under 35 U.S.C. 154(b) by 85 days.

(21) Appl. No.: 10/275,281

(22) PCT Filed: Apr. 17, 2001

(86) PCT No.: PCT/EP01/04371
§ 371 (c)(1), (2), (4) Date: Nov. 13, 2002

(87) PCT Pub. No.: WO01/89750
PCT Pub. Date: Nov. 29, 2001

(65) Prior Publication Data
US 2004/0089636 A1 May 13, 2004

(30) Foreign Application Priority Data
May 24, 2000 (EP) .............................. 00201855

(51) Int. Cl.⁷ .............................................. B23K 26/00
(52) U.S. Cl. .................. 219/69.12; 219/69.11
(58) Field of Search ........................ 219/69.12, 69.11; 148/578, 579

(56) References Cited

U.S. PATENT DOCUMENTS

| | | | | |
|---|---|---|---|---|
| 3,048,497 A | * | 8/1962 | Moller ....................... 427/594 |
| 3,885,120 A | * | 5/1975 | Ropitzky ..................... 219/73 |
| 4,287,404 A | * | 9/1981 | Convers et al. .......... 219/69.12 |
| 4,422,906 A | * | 12/1983 | Kobayashi ................... 205/218 |
| 4,759,806 A | * | 7/1988 | Dambre ...................... 148/596 |
| 4,968,867 A | * | 11/1990 | Banzai et al. ............. 219/69.12 |
| 4,983,227 A | * | 1/1991 | Reiniche et al. ............ 148/500 |

FOREIGN PATENT DOCUMENTS

| | | |
|---|---|---|
| DE | 196 35 775 | 3/1998 |
| EP | 0 330 752 | 9/1989 |

OTHER PUBLICATIONS

Patent Abstracts of Japan, vol. 008, No. 230 (M–333), Oct. 23, 1984, JP 59–110515.

Patent Abstracts of Japan, vol. 012, No. 442 (M–766), Nov. 21, 1988, JP 63–174717.

Patent Abstracts of Japan, vol. 009, No. 130 (C–284), Jun. 5, 1985, JP 60–017044.

* cited by examiner

Primary Examiner—M. Alexandra Elve
(74) Attorney, Agent, or Firm—Foley & Lardner LLP

(57) ABSTRACT

An electrode for electric discharge machining comprises a high strength pearlitic steel wire having a carbon content higher than 0.6% and a tensile strength higher than 3000 N/mm2. The steel wire is coated with a copper free zinc or zinc alloy coating. The electrode is in particular suitable for high precision performance applications.

12 Claims, 2 Drawing Sheets

ELECTRIC DISCHARGE MACHINING WIRE

FIELD OF THE INVENTION

The invention relates to an electrode for electric discharge machining.

BACKGROUND OF THE INVENTION

The process of electrical discharge machining (EDM) is well known: it is a method to cut conductive materials with an electrode wire that follows a programmed path.

An electrode for EDM has to meet a number of requirements. In the first place, a good machinability, i.e. a high removal rate, a good surface finish and a high precision, is required.

Furthermore, in order to obtain an automated system, a good threadability is desired.

The machining conditions and the path along which the workpiece is cut, are stored in a control device memory.

During machining, due to the electric discharge, a force with an orientation opposite to the direction in which the machining is proceeding is created on the machining sections of the wire electrode.

As a consequence, the wire lags in the direction in which the machining is proceeding.

Also electrostatic and electromagnetic forces are created on the wire electrode.

Due to all these forces and due to the vibrations of the wire, the actual position of the wire is different from the programmed position. This results in accuracy and precision problems.

This is especially critical for corner cutting. Deviation from the programmed outline at the corners has as result that round corners are obtained in stead of the desired sharp corners.

The deviation between the programmed and the effective outline can be reduced by applying a mechanical load to the wire.

If a high degree of accuracy and precision is desired, the use of wires with a small diameter is desired.

However, since only a limited mechanical load can be applied on the conventional finer wires, such as brass wires, it is difficult to obtain a high degree of accuracy and precision.

Therefore, for example plain Mo or W-wires are used for high precision cutting. These wires have a rather high tensile strength (>1900 MPa) but they have the drawback to be expensive.

Furthermore, since they are characterised by a high melting temperature, they have a low vapor pressure with poor flushability.

SUMMARY OF THE INVENTION

It is an object of the present invention to provide an EDM wire electrode having a high tensile strength.

It is also an object to provide an EDM wire electrode which is machining a desired contour with high precision and high accuracy while maintaining a high machining speed.

It is another object to provide an EDM wire electrode which can be manufactured at low costs.

According to a first aspect of the invention, an electrode for electrical discharge machining is provided.

The electrode consists of a high strength pearlitic steel wire having a diameter of 0.35 mm or below.

The steel wire is a high carbon steel wire with a carbon content ranging between 0.6 to 1.2%. More preferably, the carbon content is higher than 0.7%.

The wire has a tensile strength higher than 3000 N/mm$^2$, for example 3500 N/mm$^2$ or 4000 N/mm$^2$.

The wire is coated with a copper free zinc or zinc alloy.

Possibly, small traces of copper are present in the zinc or zinc alloy coating layer.

The pearlitic structure is obtained by heating the steel to a high temperature (900–1000° C.) at which carbon dissolution and austenitic formation occur, followed by immersion in a quench transformation bath at a temperature between 500 and 700° C. to decompose austenite in a pearlitic structure of desired lamellar fineness.

The patented steel so obtained can be cold deformed; it can for example be drawn or it can be rolled or flattened.

The wire may have a circular or rectangular cross-section.

Alternatively, a steel strip may be used.

If wires with a circular cross-section are used, the diameter is preferably lower than 0.35 mm, and more preferably lower than 0.25 mm, for example 0.1, 0.07 or 0.03 mm.

As flat wires, wires with a thickness lower than 0.25 mm, for example 0.1 mm, 0.05 mm or 0.02 mm can be considered.

The high strength pearlitic steel core performs the strength function while the zinc or zinc alloy coating performs the heat dissipation and machining function.

In principle, any coating technique that results in the application of a coating layer according to this invention can thereby be considered. Preferred methods are electrolysis, hot dip and cladding.

Applying a zinc or zinc alloy coating by means of a hot dip galvanizing bath has as result that an iron-zinc alloy layer is created at the surface of the wire.

For thin coatings preference is given to electrolytic deposition.

The thickness of the zinc or zinc alloy coating has to be chosen in such a way that it dissipates enough energy to avoid thermal load and thus breakage of the steel wire. On the other hand, the thickness has to be chosen so that the coated steel is still strong enough to withstand the imposed mechanical load necessary to obtain the required precision. The thickness of the zinc or zinc alloy coating is preferably between 0.1 and 20 μm.

For a wire with a diameter of 0.10 mm, the thickness of the coating is preferably between 0.5 and 10 μm and more preferably between 1 and 4 μm.

In one embodiment, the zinc alloy is a zinc aluminium alloy. Such a zinc aluminium alloy preferably comprises between 2 and 10% Al. Between 0.1 and 0.4% of a rare earth element such as La and/or Ce can be added.

Possibly, an intermediate layer is applied between the steel and the zinc or zinc alloy layer.

Such an intermediate layer can be an aluminium or a silver layer or it can comprise alloys thereof.

By applying such an intermediate layer the electrical conductivity of the electrode can be improved. The aluminium layer can for example be applied by cladding or by hot dip.

Also a nickel or nickel alloy layer can be considered as intermediate layer.

In one embodiment of the present invention, the electrode comprises an additional layer on top of the zinc or zinc alloy coating.

This additional layer can for example be obtained by the application of an additional coating layer, by a heat treatment or by a passivation process.

The thickness of the coating layer is for example a few nanometers.

Examples of an additional coating layer are a graphite coating layer, an oxide coating layer such as ZnO, $Cr_2O_3$, $Al_2O_3$, $TiO_2$, $ZrO_2$ or a conductive layer such as a Ag layer.

According to a second aspect, the use of an electrode according to the present invention for electric discharge machining applications is provided.

The electrode is in particular suitable for applications demanding a high precision and a high accuracy.

According to a further aspect of the invention a method of improving the precision and accuracy of the EDM process by applying a mechanical load to a wire electrode as described above is provided.

This method has a positive influence on the machining speed. Furthermore, applying a mechanical load on the wire may also have a positive influence on the surface finish of the machined workpiece.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
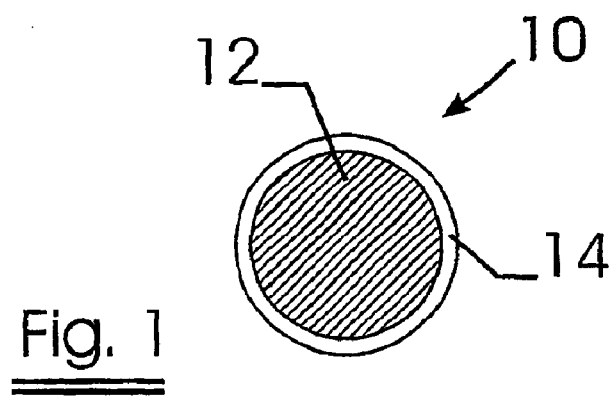
FIG. 1 shows an embodiment of a round EDM wire.

Referring to FIG. 1, an EDM wire 10 according to the present invention comprises a round steel wire 12 with a diameter of 0.10 mm.

The wire has a pearlitic structure and a tensile strength of 4000 $N/mm^2$. A zinc coating with a thickness of 0.5 $\mu m$ is applied on the wire by electrolysis or hot dip.

The wire is characterised by a high strength. Therefore a high mechanical load can be applied to the EDM wire without breakage of the wire.

By applying a higher mechanical load on the wire, precision errors due to forces created on the wire and due to vibrations of the wire are reduced or even eliminated.

The EDM wire according to the invention is also suitable for taper cutting.

Cutting angles up to 28° could be achieved without breakage of the electrode wire. The cutting angle is defined as the angle between horizontal plane of the workpiece and the EDM wire.

Figure 2A:
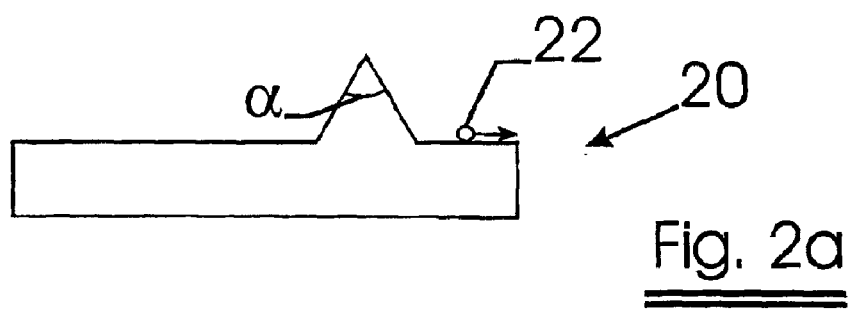
FIG. 2 illustrates the test performed in order to evaluate the precision performance of a wire according to the invention.

The precision performance of the above described wire is evaluated by cutting a workpiece 20 as shown in FIG. 2. FIG. 2a shows the cross-section of the cutted workpiece. The cutting direction of the EDM wire 22 is indicated by the arrow.

The cutting path comprises a corner α of 60°.

Figure 2B:
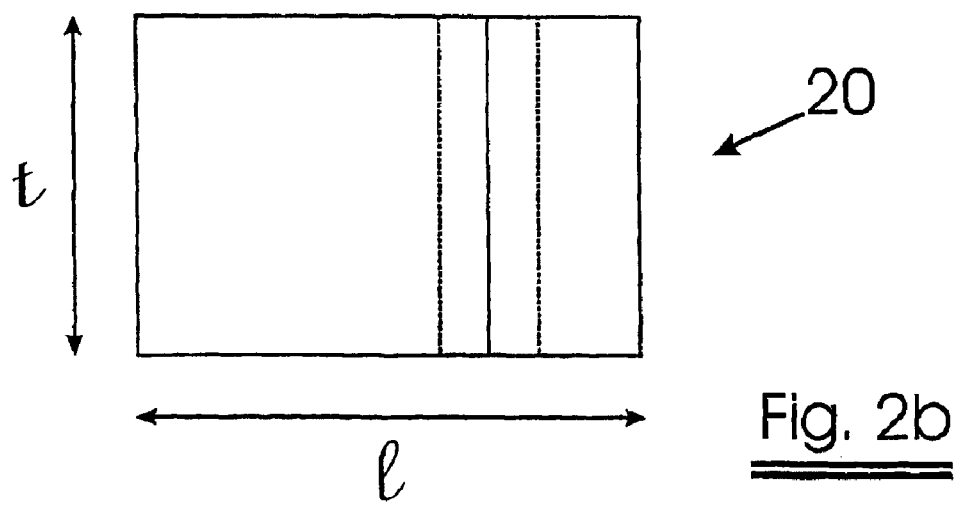

FIG. 2b shows the top-view of the cutted workpiece.

Precision can be evaluated by measuring the deviation from the desired programmed path.

Forces created at the wire electrode during the machining process have as consequence that deviations from the programmed path are observed. These deviations are called first order deviations or profile errors.

Furthermore, second order deviations, also called errors on the wire path, cause a variation over the thickness, t of the workpiece, i.e. a variation between the center and the borders.

These second order deviations are amongst others due to the bending and lagging of the wire during machining.

The cutting performance of the above-described wire is tested when a mechanical load of 0.2 kg and when a mechanical load of 1 kg is applied to the wire.

Figure 3:
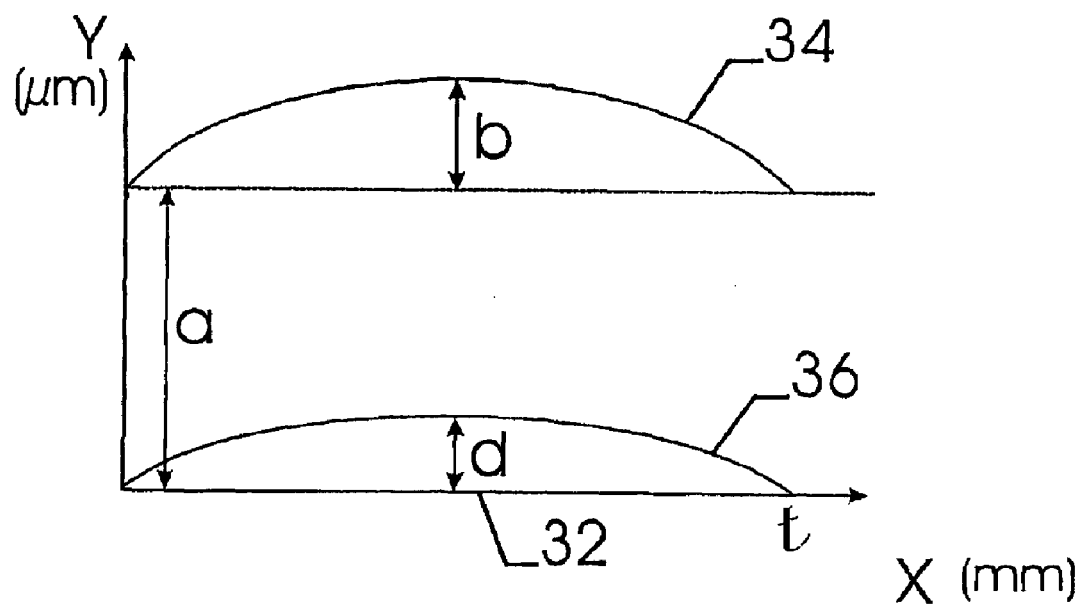
FIG. 3 shows the deviations from the programmed cutting path.

The deviation from the programmed path over the thickness t of the workpiece in both cases is illustrated in FIG. 3.

In abscissa, the thickness of the workpiece is shown, whereas the deviation from the desired, programmed path 32 is shown in ordinate. The curve 34 shows the real path that the wire follows when a mechanical load of 0.2 kg is applied.

The difference between the desired, programmed path 32 and the obtained path 34 due to first order deviations is indicated by "a". The second order deviations are the highest at the center of the workpiece. These second order deviations at the center of the workpiece are indicated on FIG. 3 by "b".

Curve 36 shows the path that the wire follows when a mechanical load of 1 kg is applied. The first order deviations are eliminated by applying a higher mechanical load and the second order deviations, indicated by "d" are reduced with 50%.

From FIG. 3, it can be concluded that applying a higher mechanical load on to wire has a positive influence on both the first and the second order deviations and consequently results in a higher precision and higher accuracy.

It has been observed that applying a higher mechanical load on the wire may also have a positive influence on the machining speed: the machining speed could be improved with 10% by increasing the mechanical load on the wire.

Furthermore, the surface finish of the surface can be improved by applying a higher mechanical load due to a more stable process.

Figure 4:
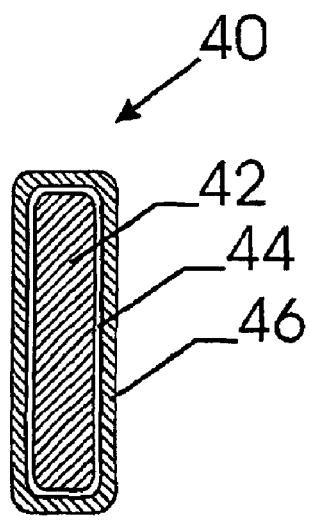
FIG. 4 shows an embodiment of a flat EDM wire.

In another embodiment, as shown in FIG. 4, an EDM wire 40 has a flat or rectangular cross-section.

This type of wire allows it to combine a high precision and high machining speeds: high machining speeds are obtained because of the heat transfer through the large 'flat' side; while high precision is obtained by cutting with the 'thin' side.

Flat wires furthermore have the advantage that they can be made very straight which will facilitate (automatic) threading.

The flat wire 42 has a width of 0.10 mm and a thickness of 0.02 mm. A thin Al coating 44 is applied on the wire by cladding or by hot dip. In a subsequent step the wire is coated with a Zn alloy layer 46 with a thickness of 0.5 $\mu m$.

What is claimed is:

1. An electrode for electric discharge machining, said electrode comprising: a high strength pearlitic steel wire having a carbon content higher than 0.6%, having a diameter of 0.35 mm or below and having a tensile strength higher than 3000 $N/mm^2$, said steel wire being coated with one or more coatings so that said electrode obtains a higher precision and a higher accuracy in electric discharge machining, wherein at least one of the coatings is a zinc or zinc alloy coating, and wherein the coatings are substantially free of copper.

2. An electrode according to claim 1, wherein said wire has a diameter lower than 0.10 mm.

3. An electrode according to claim 1, wherein said wire has a flat or rectangular cross-section.

4. An electrode according to claim 1, wherein an iron-zinc alloy layer is created at the surface of the steel wire.

5. An electrode according to claim 1, wherein the zinc alloy is a zinc aluminum alloy.

6. An electrode according to claim 1, wherein said electrode has an intermediate layer of aluminum, silver or nickel or of alloys thereof between the steel wire and the zinc or zinc alloy layer.

7. An electrode according to claim 1, wherein said electrode comprises an additional layer on top of said zinc or zinc alloy coating.

8. A method of using the electrode of claim 1, comprising the step of: using the electrode in an electric discharge machining application.

9. The method of using the electrode of claim 8, further comprising: using the electrode for high precision performance applications.

10. A method of improving the precision and accuracy of an electric discharge machining process by applying a mechanical load to the wire electrode according to claim 1.

11. An electrode for electric discharge machining, comprising a high strength pearlitic steel wire having a carbon content higher than 0.6%, having a diameter of 0.35 mm or below and having a tensile strength higher than 3000 $N/mm^2$, said steel wire being coated only with one or more zinc or zinc alloy coatings, wherein the coatings are substantially free of copper.

12. A method of improving the precision and accuracy of an electric discharge machining process, the method comprising the steps of:

providing a high strength pearlitic steel wire having a carbon content higher than 0.6%, having a diameter of 0.35 mm or below, and having a tensile strength higher than 3000 $N/mm^2$, wherein the steel wire includes one or more coatings that are substantially free of copper, and wherein at least one of the coatings is a zinc or zinc alloy coating; and applying a mechanical load to the wire.

* * * * *